(12) United States Patent
Selle (10) Patent No.: US 7,540,699 B2
(45) Date of Patent: Jun. 2, 2009

(54) ADJUSTABLE THRESHOLD FASTENER WITH FLANGES

(75) Inventor: Stephen Selle, Mentor, OH (US)

(73) Assignee: Stafast Products, Inc., Painesville, OH (US)

( * ) Notice: Subject to any disclaimer, the term of this patent is extended or adjusted under 35 U.S.C. 154(b) by 751 days.

(21) Appl. No.: 10/824,915

(22) Filed: Apr. 15, 2004

(65) Prior Publication Data

US 2005/0232724 A1 Oct. 20, 2005

(51) Int. Cl.
*F16B 43/02* (2006.01)
(52) U.S. Cl. .............. 411/546; 411/435
(58) Field of Classification Search ........... 411/435, 411/546, 533, 547; 206/338, 343, 346, 347
See application file for complete search history.

(56) References Cited

U.S. PATENT DOCUMENTS

| | | | | |
|---|---|---|---|---|
| 244,379 | A * | 7/1881 | Coulter et al. | 411/435 |
| 397,988 | A * | 2/1889 | Kimball | 411/435 |
| 596,948 | A * | 1/1898 | Seely | 49/468 |
| 646,465 | A * | 4/1900 | Seely | 49/468 |
| 797,545 | A * | 8/1905 | Reed | 411/546 |
| 812,294 | A * | 2/1906 | Ette | 411/435 |
| 1,773,146 | A * | 8/1930 | Kellogg | 411/435 |
| 1,919,728 | A * | 7/1933 | Kellogg | 411/435 |
| 2,049,104 | A * | 7/1936 | Charlton | 411/435 |
| 2,314,756 | A * | 3/1943 | Bedford, Jr. | 411/280 |
| 2,343,947 | A * | 3/1944 | Auslander | 411/435 |
| 2,383,141 | A * | 8/1945 | Maage, Jr. | 411/435 |
| 2,968,206 | A * | 1/1961 | Bunnosuke | 411/435 |
| 3,050,097 | A * | 8/1962 | Cochran | 411/107 |
| 3,319,509 | A * | 5/1967 | Costantino | 411/435 |
| 3,505,636 | A * | 4/1970 | McDowell | 439/758 |
| 3,646,982 | A * | 3/1972 | Cushman | 411/82.5 |
| 3,704,507 | A * | 12/1972 | Grube | 29/417 |
| 3,809,139 | A * | 5/1974 | Strain | 411/183 |
| 3,816,746 | A * | 6/1974 | Gugliotta et al. | 250/223 R |
| 3,845,860 | A * | 11/1974 | Ladouceur et al. | 206/338 |
| 3,878,599 | A * | 4/1975 | Ladouceur et al. | 29/432.2 |
| 3,900,967 | A * | 8/1975 | Bursk et al. | 49/468 |
| 3,920,059 | A * | 11/1975 | Grube | 411/179 |
| 3,926,236 | A * | 12/1975 | Pouch et al. | 411/179 |
| 3,962,828 | A * | 6/1976 | McAllister | 49/468 |
| 3,967,412 | A * | 7/1976 | Governale | 49/468 |
| 3,983,388 | A * | 9/1976 | Gugliotta | 250/223 R |
| 4,040,228 | A * | 8/1977 | Skubic | 52/710 |
| 4,074,464 | A * | 2/1978 | McCay | 49/468 |
| 4,279,341 | A * | 7/1981 | Pleickhardt | 206/345 |
| 4,306,654 | A * | 12/1981 | Grube | 206/343 |
| 4,352,258 | A * | 10/1982 | Bursk et al. | 49/468 |
| 4,376,334 | A * | 3/1983 | Miller | 29/437 |
| 4,377,360 | A * | 3/1983 | Kennedy | 411/116 |
| 4,379,537 | A * | 4/1983 | Perrault et al. | 248/74.3 |
| 4,387,535 | A * | 6/1983 | Corbo | 49/468 |
| 4,447,987 | A * | 5/1984 | Lesosky | 49/468 |
| 4,476,653 | A * | 10/1984 | Speer et al. | 49/468 |

(Continued)

*Primary Examiner*—William L. Miller
(74) *Attorney, Agent, or Firm*—Woodling, Krost and Rust (57) ABSTRACT

A fastener comprising a threaded stud and a rectangular nut having raised flanges is disclosed. Raised flanges enable passing the fasteners in a curvilinear dispensing track. The rectangular nut resides in a channel in a threshold device and is restrained against rotational movement. The threaded stud includes a flat head adjustable in a plurality of positions which, in turn, enables positioning of the threshold.

2 Claims, 7 Drawing Sheets

U.S. PATENT DOCUMENTS

| | | | | |
|---|---|---|---|---|
| 4,768,907 A * | 9/1988 | Gauron | | 411/85 |
| 4,790,701 A * | 12/1988 | Baubles | | 411/85 |
| 4,903,831 A * | 2/1990 | Francis | | 206/347 |
| 4,945,680 A * | 8/1990 | Giguere | | 49/468 |
| 4,961,553 A * | 10/1990 | Todd | | 248/62 |
| 4,971,499 A * | 11/1990 | Ladouceur | | 411/179 |
| 5,010,690 A * | 4/1991 | Geoffrey | | 49/468 |
| 5,078,537 A * | 1/1992 | Nomura | | 411/84 |
| 5,096,350 A * | 3/1992 | Peterson | | 411/12 |
| 5,136,814 A * | 8/1992 | Headrick | | 49/468 |
| 5,179,804 A * | 1/1993 | Young | | 49/471 |
| 5,205,092 A * | 4/1993 | Taylor | | 52/177 |
| 5,214,843 A * | 6/1993 | Bromley et al. | | 29/798 |
| 5,230,181 A * | 7/1993 | Geoffrey et al. | | 49/469 |
| 5,239,728 A * | 8/1993 | Redman | | 16/244 |
| 5,273,351 A * | 12/1993 | Rubel | | 305/180 |
| 5,299,686 A * | 4/1994 | Bromley et al. | | 206/338 |
| 5,314,427 A * | 5/1994 | Goble et al. | | 606/72 |
| 5,327,645 A * | 7/1994 | Bromley et al. | | 29/809 |
| 5,426,894 A * | 6/1995 | Headrick | | 49/468 |
| 5,489,173 A * | 2/1996 | Hofle | | 411/85 |
| 5,517,788 A * | 5/1996 | McGough et al. | | 49/468 |
| 5,524,391 A * | 6/1996 | Joffe et al. | | 49/468 |
| 5,588,266 A * | 12/1996 | Headrick | | 52/204.1 |
| 5,611,173 A * | 3/1997 | Headrick et al. | | 49/468 |
| 5,624,217 A * | 4/1997 | Hungerford, Jr. | | 411/85 |
| 5,638,641 A * | 6/1997 | Joffe et al. | | 49/469 |
| 5,762,190 A * | 6/1998 | Leistner | | 206/347 |
| 5,893,538 A * | 4/1999 | Onishi et al. | | 248/65 |
| 5,918,738 A * | 7/1999 | Leistner | | 206/344 |
| 5,993,320 A * | 11/1999 | Selle | | 470/26 |
| 6,095,738 A * | 8/2000 | Selle | | 411/427 |
| 6,185,870 B1 * | 2/2001 | Mettler | | 49/468 |
| 6,203,231 B1 * | 3/2001 | Salice | | 403/12 |
| 6,209,722 B1 * | 4/2001 | Leistner | | 206/344 |
| 6,272,814 B1 * | 8/2001 | Ikuta et al. | | 53/473 |
| 6,305,888 B1 * | 10/2001 | Leistner | | 411/177 |
| 6,345,477 B1 * | 2/2002 | Kepler et al. | | 52/204.1 |
| 6,550,999 B2 * | 4/2003 | Petit et al. | | 401/70 |
| 6,640,968 B2 * | 11/2003 | Selle | | 206/303 |
| 2003/0049097 A1* | 3/2003 | Selle | | 411/521 |
| 2003/0116458 A1* | 6/2003 | Donner | | 206/345 |
| 2004/0200152 A1* | 10/2004 | Khanlarian | | 49/468 |
| 2004/0200153 A1* | 10/2004 | Khanlarian | | 49/468 |
| 2004/0234356 A1* | 11/2004 | Parker et al. | | 411/181 |
| 2005/0013679 A1* | 1/2005 | Ladoucer et al. | | 411/180 |
| 2005/0210754 A1* | 9/2005 | Ferrell | | 49/468 |

\* cited by examiner

ADJUSTABLE THRESHOLD FASTENER WITH FLANGES

FIELD OF THE INVENTION

The invention is in the field of fasteners used in connection with door thresholds and in particular with the adjustment of the height of door thresholds.

BACKGROUND OF THE INVENTION

U.S. Pat. No. 5,611,173 to Headrick et al. discloses a threshold having a threaded pedestal 32 and support pad 33 as well as a correspondingly threaded lug 34 adapted to receive the threaded pedestal 32. See, FIGS. 2 and 6 of the '173 patent. Also see U.S. Pat. Nos. 5,588,266 and 5,426,894 to Headrick. Each of the foregoing patents discloses a lug 34 captured in a slot which cooperates with a threaded pedestal to vertically raise and lower a threshold.

U.S. Pat. No. 6,345,477 to Keppler et al. discloses a series of screws 64 and nuts 66. According to the '477 specification: "Nuts 66 fit within the channel below web 68 between the adjacent sides. Nuts 66 are sufficiently large so that they are prohibited from turning and may transmit an axial load along the screw axis to web 68." Rotation of the screws 64 adjust the height of the threshold.

Each of the following United States Patents disclose an adjustable threshold: U.S. Pat. No. 4,387,535; U.S. Pat. No. 4,074,464; U.S. Pat. No. 5,524,391; U.S. Pat. No. 5,517,788; U.S. Pat. No. 5,179,804; U.S. Pat. No. 4,447,987; U.S. Pat. No. 4,476,653; U.S. Pat. No. 4,945,680; U.S. Pat. No. 5,136,814; U.S. Pat. No. 3,962,828; U.S. Pat. No. 3,967,412; and U.S. Pat. No. 4,352,258. These disclosures are indicative of the state of the art.

Figure 2:
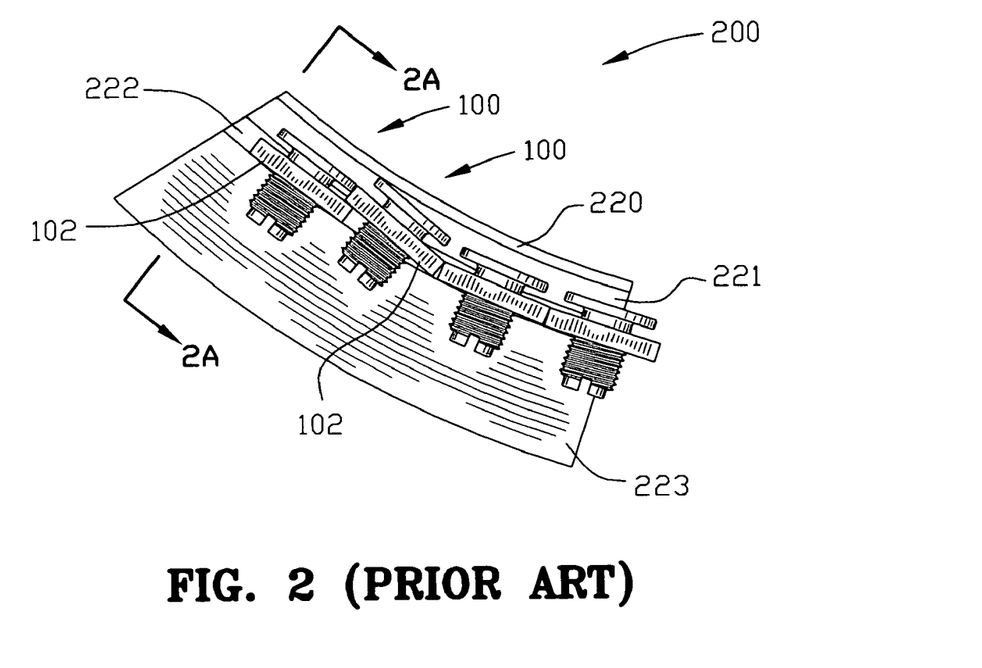
FIG. 2 is a side view of the interior of a section of a curvilinear track with several prior art fasteners located therein.

A particular problem in the dispensation of adjustable threshold fasteners is the fact that they tend to jam in the curvilinear track which feeds the insertion mechanism. See, FIG. 2 in this application for patent which illustrates jamming of the fasteners in the feed track. Referring to FIG. 2, adjacent fasteners are illustrated in a shingling fashion such that the higher fastener wedges underneath the adjacent lower fastener. Shingling can also occur such that the higher fastener rides up above the adjacent lower fastener.

FIG. 2 is a side view 200 of the interior of a section of a curvilinear track 223 with several prior art fasteners 100 located therein. FIG. 2 illustrates a head-guide 221, a nut-guide 222, and a rimmed edge 220. Typically, the track 223 is gravity fed with fasteners. The weight, momentum and inertia of a plurality of fasteners apply pressure to the fasteners when they abruptly stop in the track due to a stoppage in the demand for the fasteners. Additionally, variance in the dimensions of the fasteners is a contributing cause to the shingling and jamming of the fasteners.

Figure 2A:
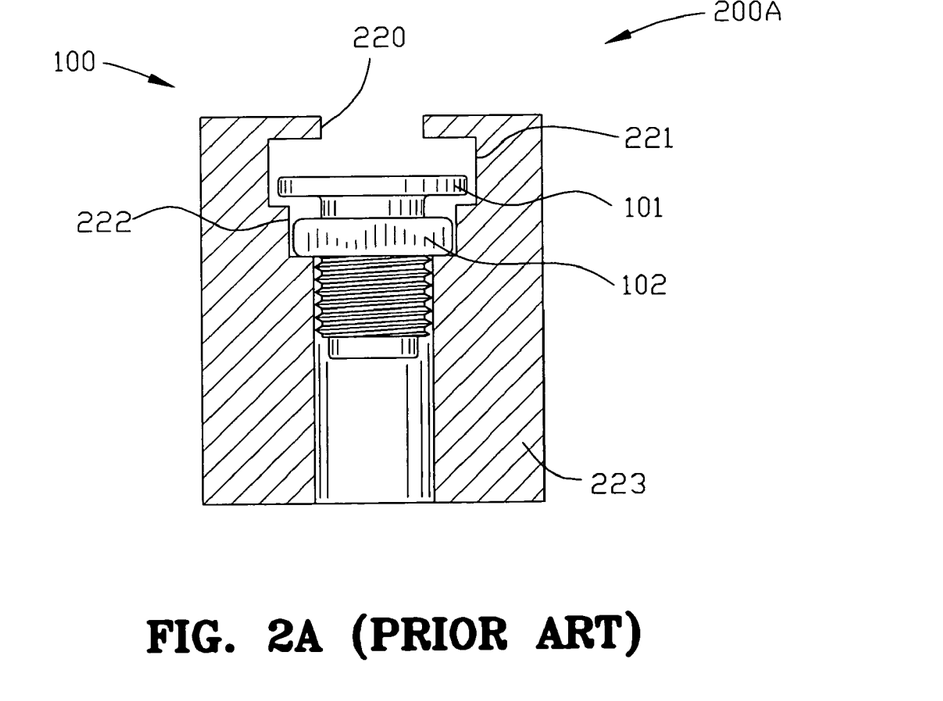
FIG. 2A is an end view of the track of FIG. 2 illustrating a prior art fastener therein.

FIG. 2A is an end view 200A of the track of FIG. 2 illustrating a prior art fastener therein. The insertion mechanism press-fits a threaded stud into and through a wall of the threshold. The stud is then rotatably adjustable with respect to the wall. The materials of the threshold may be plastic, wood or metal and the material of the threaded stud is plated steel. A reciprocally threaded nut is also carried with the stud and when the stud is inserted into the threshold, one surface of the nut engages the threshold. The threaded stud has two ends and may be rotated from either end thereof. When the stud is rotated it has the effect of extending the support surface away from the threshold enabling the threshold to be adjusted vertically.

Figure 1:
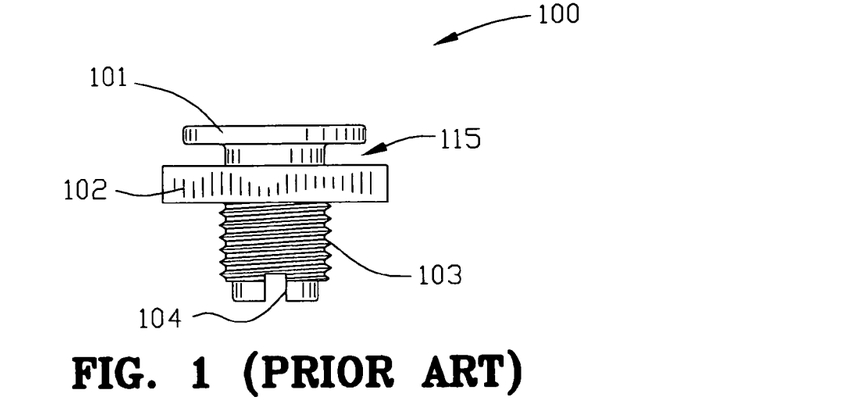
FIG. 1 is a side view of a prior art fastener.

FIG. 1 is a side view of a prior art adjustable fastener 100 illustrating a bolt head or support surface 101, a neck 115, a rectangularly shaped nut 102, threaded shaft 103 and an adjustment 104 adapted to receive a screw driver. Although the adjustment 104 is oriented at the bottom of FIG. 1, when the adjustable fastener is press-fit into a threshold, the orientation of the fastener is reversed. In other words the fastener is oriented 180 degrees from that shown in FIG. 1.

Figure 1A:
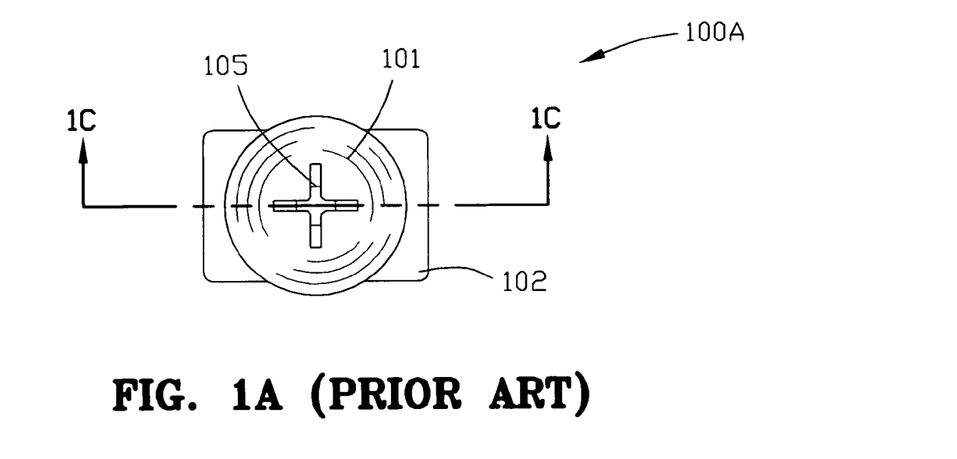
FIG. 1A is a top view of the prior art fastener of FIG. 1.
Figure 1B:
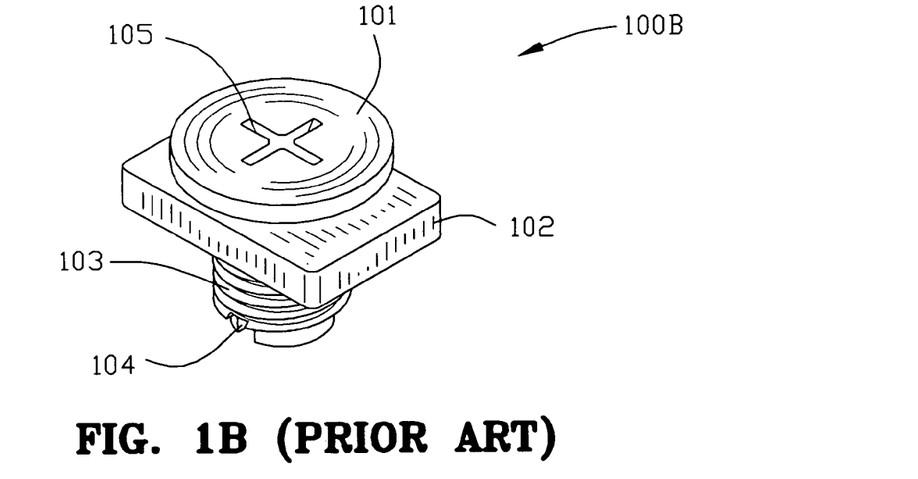
FIG. 1B is a perspective view of the prior art fastener of FIG. 1B.
Figure 1C:
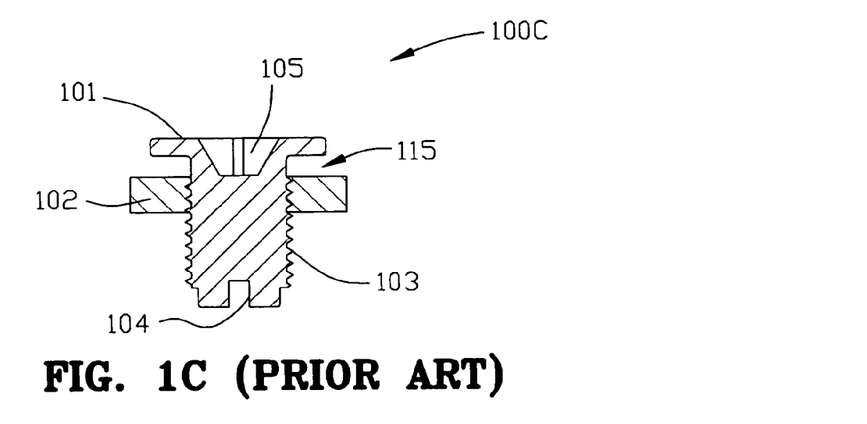
FIG. 1C is a cross-sectional view of the prior art fastener taken along lines 1C-1C of FIG. 1A.
Figure 1D:
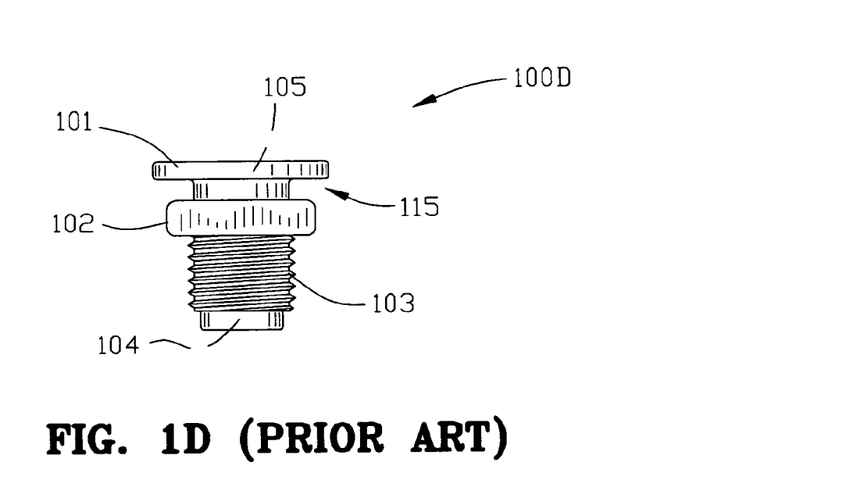
FIG. 1D is an end view of the prior art fastener of FIG. 1.
Figure 1E:
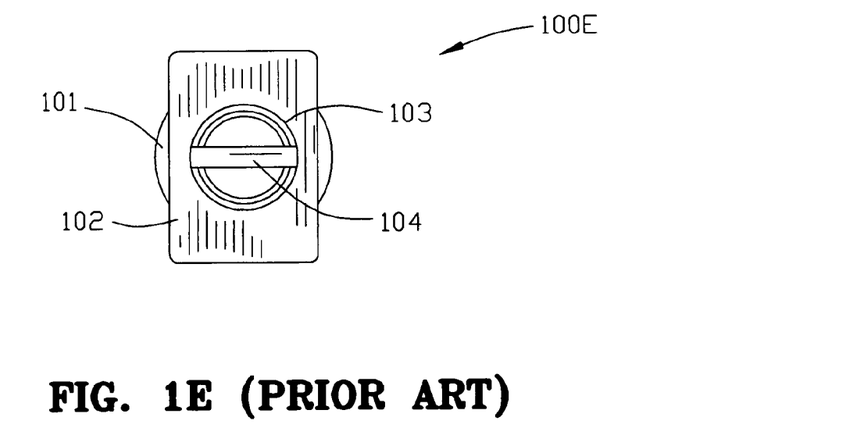
FIG. 1E is a bottom view of the prior art fastener of FIG. 1.

FIG. 1A is a top view 100A of the prior art fastener of FIG. 1 illustrating adjustment 105 which is adapted to receive a screw driver. FIG. 1B is a perspective view 100B of the prior art fastener of FIG. 1. FIG. 1C is a cross-sectional view 100C of the prior art fastener taken along lines 1C-1C of FIG. 1A. FIG. 1D is an end view 100D of the prior art fastener of FIG. 1 and FIG. 1E is a bottom view 100E of the prior art fastener of FIG. 1.

Given the foregoing prior art, it is desirable to have an adjustable threshold fastener which is capable for delivery by a feed track without jamming the feed track.

SUMMARY OF THE INVENTION

An adjustable fastener comprising a threaded stud and a rectangularly shaped nut having first and second ends is disclosed. The first and second ends each have raised flanges and the threaded stud interengages the rectangularly-shaped nut. The rectangularly-shaped nut includes a raised crown having interior threads therein. The raised flanges extend upwardly partially enveloping the threaded stud. The threaded stud includes first and second adjustment receptacles for rotatably adjusting the stud and a support surface integral with the stud away from a threshold to raise the threshold Walls in the threshold form a channel therein. One of the walls of the channel includes a bore therein which receives the threaded stud of the fastener which is press-fit in the bore of the channel. Preferably the nut is a rectangularly-shaped nut and has flanges extending from two ends of the nut. The nut has a first surface residing in contact with a wall of the channel such that it is restrained against rotation by the channel and is maintained in contact therewith. The threaded stud includes a flat head or support surface adjustable in a plurality of positions. Each end of the stud includes a screw driver receptacle for rotation of the stud relative to the nut and the bore in the wall of the channel.

A curvilinear delivery track for delivering a plurality of fasteners includes a head guide and a flange guide. Each of the fasteners comprises a U-shaped, in cross-section, nut adapted to receive a threaded stud. Each of the U-shaped nuts includes a forward and a rearward flange. The head guides of the delivery track engage the heads of the fasteners preventing excessive rotation or vertical displacement of the fasteners. The heads of the fasteners in combination with the head guide prevent shingling and/or jamming of the delivery track.

The flanges are preferably oriented perpendicular to the support surface of the nut but other non-perpendicular orientations are specifically contemplated herein.

It is an object of the invention to provide an adjustable threshold fastener with flanges to prevent shingling and/or jamming in a delivery track.

It is a further object of the present invention to provide an adjustable threshold fastener with flanges which are shaped so as to prevent shingling and/or jamming.

A better understanding of the invention and an understanding of these and other objects will be had when reference is made to the Brief Description Of The Drawings, Detailed Description of the Invention and the Claims which follow hereinbelow.

A better understanding of the invention will be had when reference is made to the Description of the Invention and Claims which follow hereinbelow.

DESCRIPTION OF THE INVENTION

Figure 3:
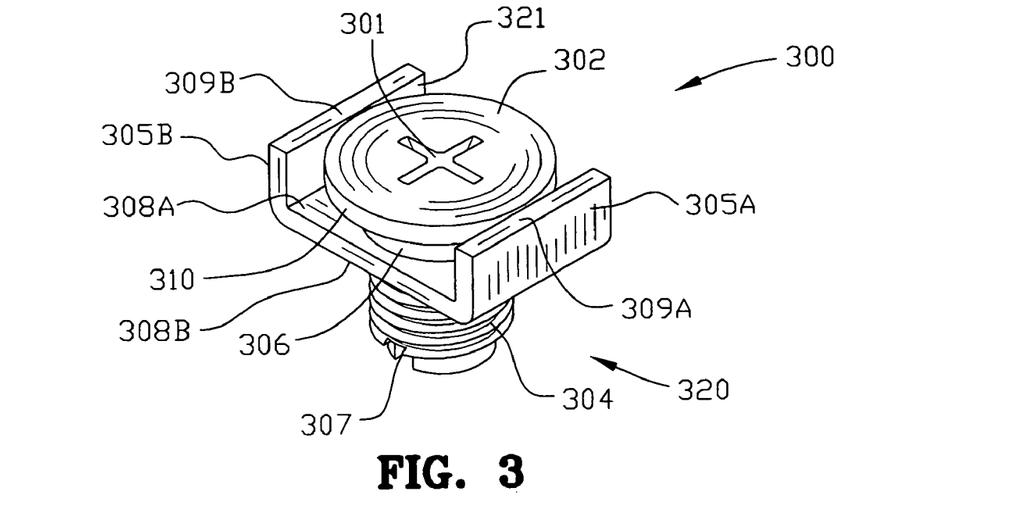
FIG. 3 is a perspective view of the fastener of the instant invention.

FIG. 3 is a perspective view of the adjustable threshold fastener 300 of the instant invention. Receptacles 301, 307 provide for rotational adjustment of the threaded stud 320. Nut 321 is generally rectangularly shaped and includes a frontward flange 305A and a rearward flange 305B. The flanges are preferably oriented perpendicular to the support surface of the nut but other non-perpendicular orientations are specifically contemplated herein. The head or support surface 302 of the threaded stud 320 is illustrated in FIG. 3. Receptacle 301 is illustrated in FIG. 3 for engagement with a screw driver to rotate the threaded stud. Nut 321 includes inner surface 308A and engagement surface 308B illustrated in FIG. 3B. Nut 321 further includes threads therein and the threads extend into crown 306.

Figure 3A:
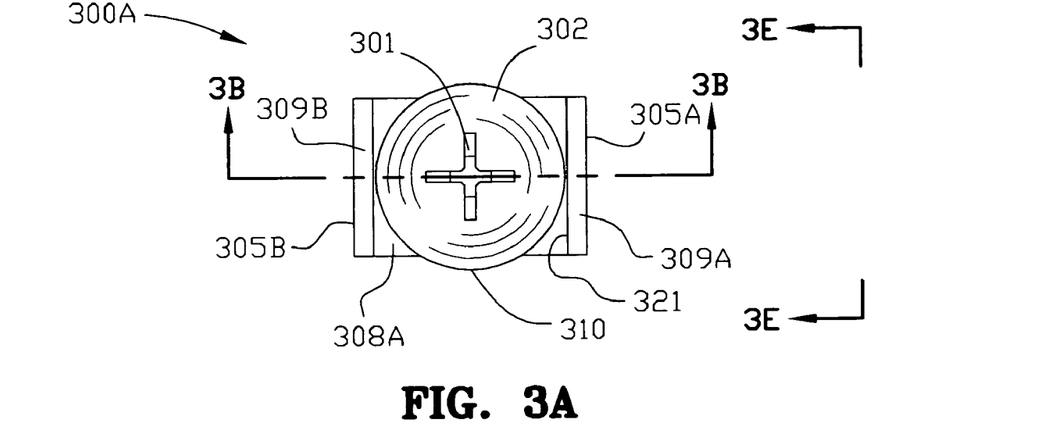
FIG. 3A is a top view of the fastener of the instant invention.
Figure 3B:
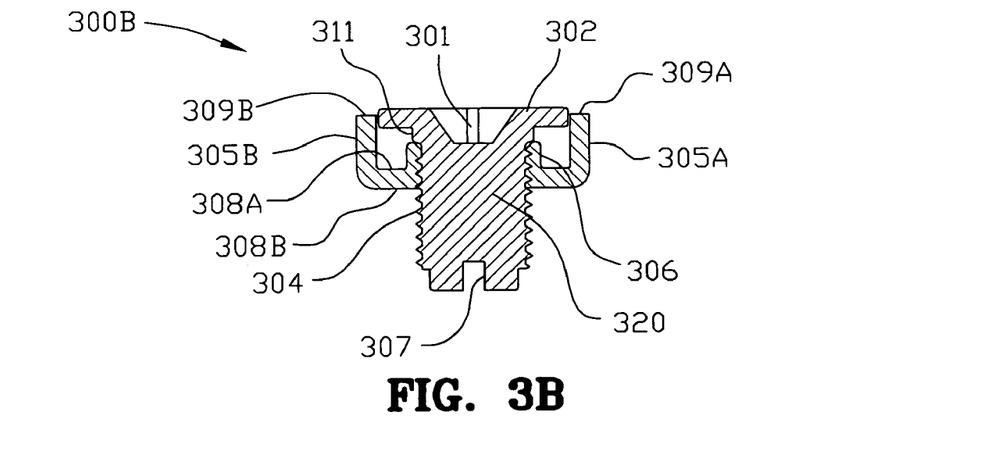
FIG. 3B is a cross-sectional view of the instant invention taken along the lines 3B-3B of FIG. 3A.
Figure 3C:
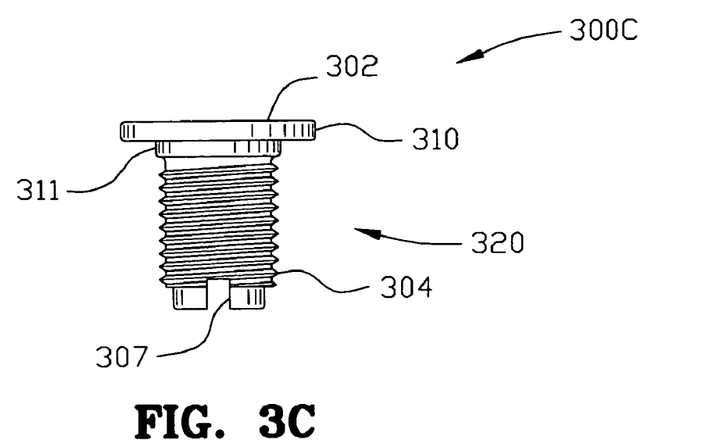
FIG. 3C is a side view of the threaded stud of the instant invention.

It will be noted from FIGS. 3, 3B and 3C, that stud 320 includes a shoulder 311 which acts as a stop limiting the inward engagement of the stud 320 with respect to the nut 321. Reference numeral 304 signifies the threads on the stud 320. Head or support surface 302 is flat and has a diameter which exceeds the width of the nut 321. Reference numeral 310 signifies the circumference of the head 302. Head 302 may engage a reference surface for positioning the threshold illustrated in FIGS. 5, 5A and 5B.

Figure 3D:
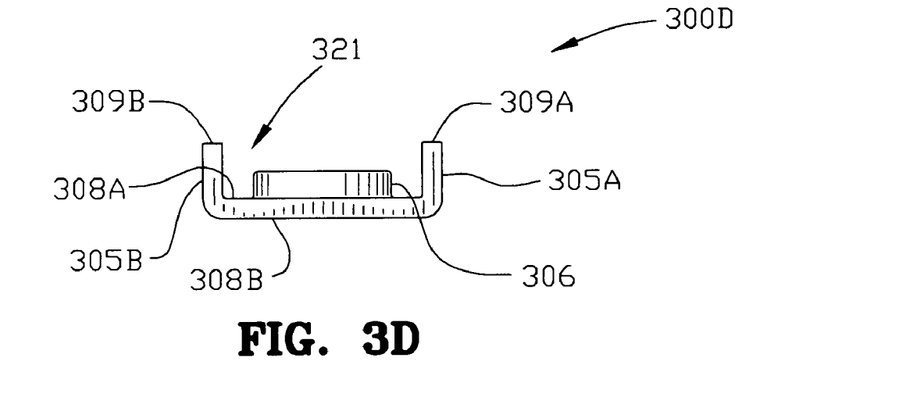
FIG. 3D is a side view of the U-shaped nut of the instant invention.
Figure 3E:
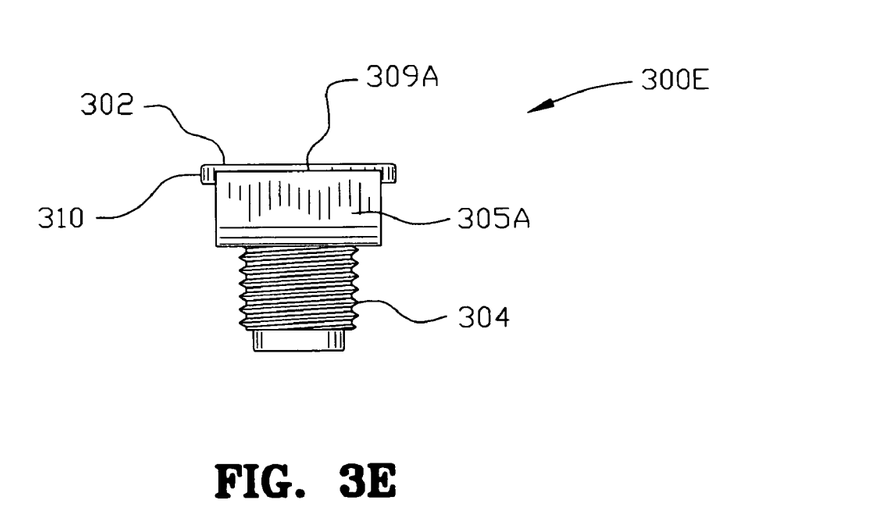
FIG. 3E is an end view of the fastener of the instant invention.

FIG. 3A is a top view 300A of the fastener of the instant invention and FIG. 3B is a cross-sectional view 300B of the instant invention taken along the lines 3B-3B of FIG. 3A. FIG. 3C is a side view 300C of the threaded stud of the instant invention and FIG. 3D best illustrates the side view 300D of the U-shaped nut 321 of the instant invention. FIG. 3E is an end view 300E of the fastener of the instant invention.

Figure 4:
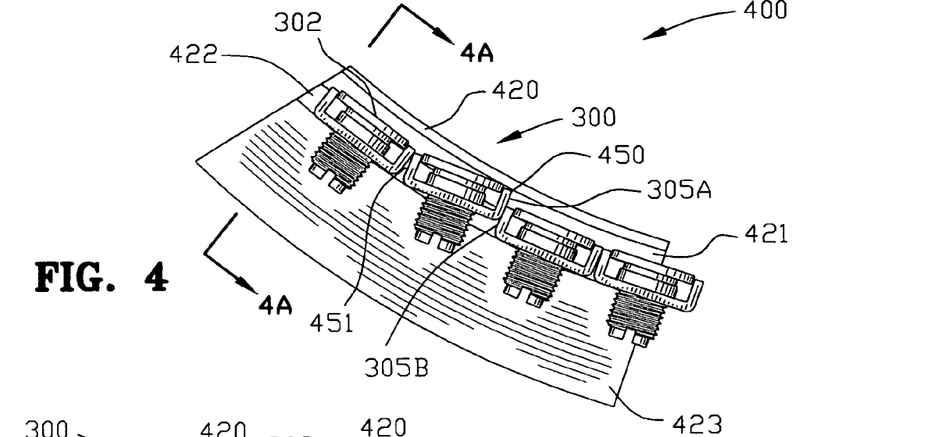
FIG. 4 is a side view of the interior of a section of a curvilinear track with several fasteners of the instant invention located therein.

FIG. 4 is a side interior view 400 of a section of a curvilinear track 423 with several fasteners 300 of the instant invention located therein. Track 423 includes a nut guide 422, a support guide (head guide) 421 and a rimmed portion or edge 420. The flanges 305A and 305B of a fastener routinely collide with the adjacent neighboring fasteners and their flanges. Due to the respective height of the flanges, their rotation is limited as is their vertical displacement. Flanges 305A and 305B each have respective top portions 309A and 309B which engage 450 the rimmed edge 420 as illustrated in FIG. 4. Further, the flanges 305A, 305B, are vertically high enough as illustrated in FIG. 3D to prevent shingling and jamming. Thus the angle 451 formed between the respective flanges 305B and 305A as illustrated in FIG. 4 is acute and limited. FIG. 4B is an enlargement 400B of a portion of FIG. 4 illustrating the interaction between the flanges 305A, 305B of neighboring fasteners.

Figure 4A:
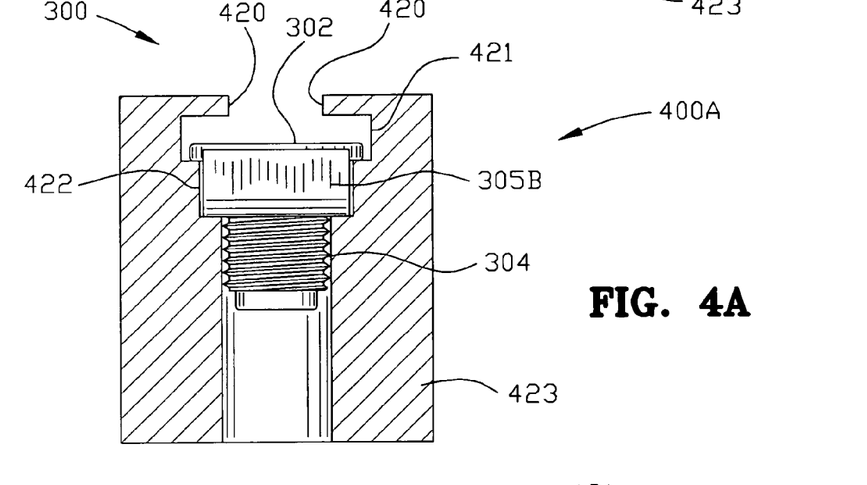
FIG. 4A is an end view of the track of FIG. 4 illustrating a fastener of the instant invention therein.
Figure 4B:
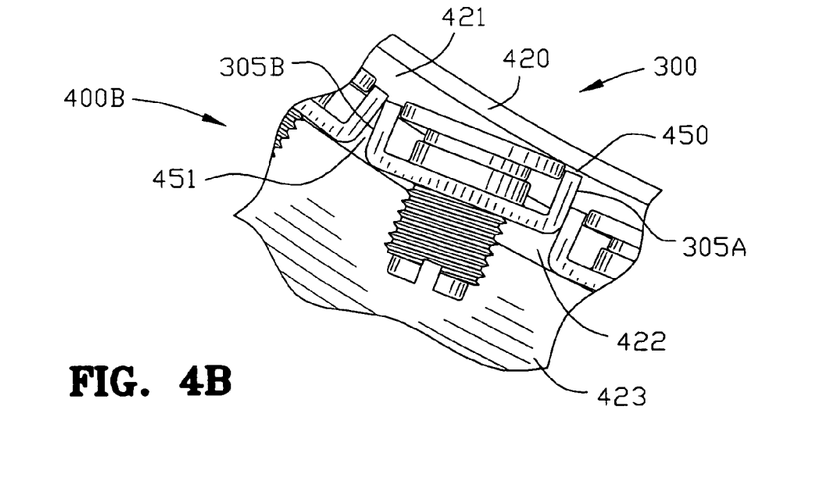
FIG. 4B is an enlargement of a portion of FIG. 4 illustrating the interaction between the flanges of neighboring fasteners.

FIG. 4A is an end view 400A of the track of FIG. 4 illustrating a fastener of the instant invention therein.

Figure 5:
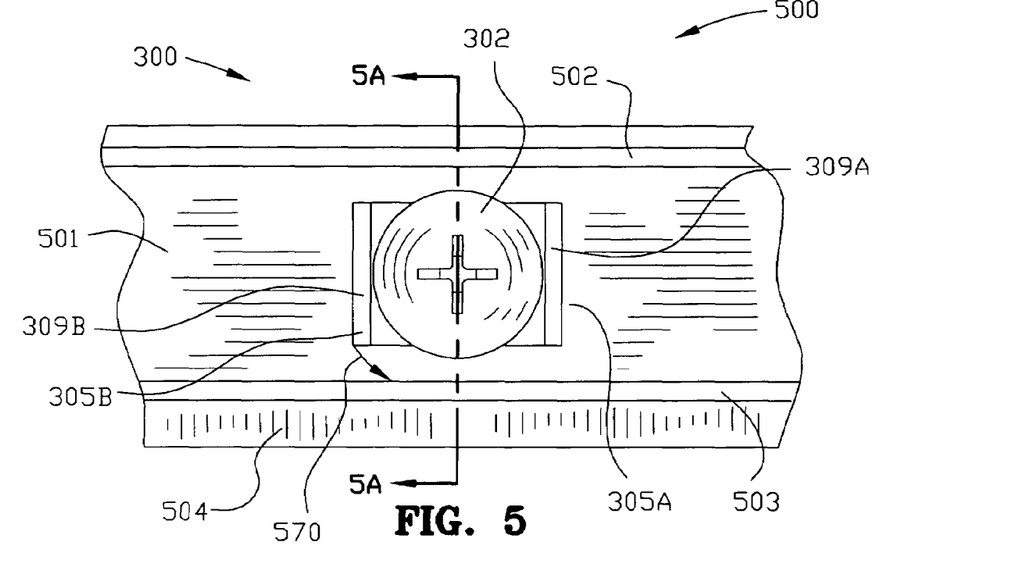
FIG. 5 is a bottom view of a threshold with the fastener of the instant invention press-fit therein.
Figure 5A:
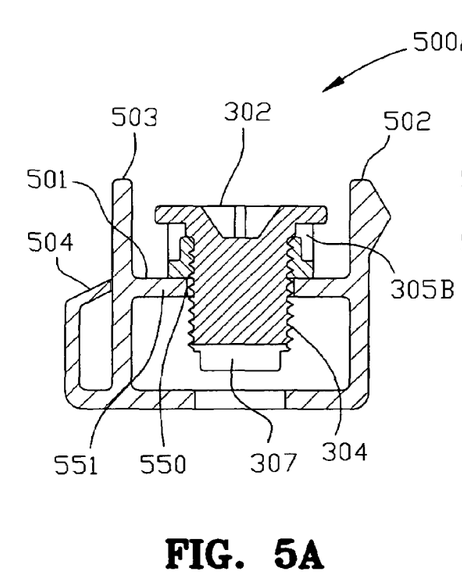
FIG. 5A is cross-sectional view taken along the lines 5A-5A of FIG. 5 illustrating the attachment of the fastener of the instant invention in a threshold.
Figure 5B:
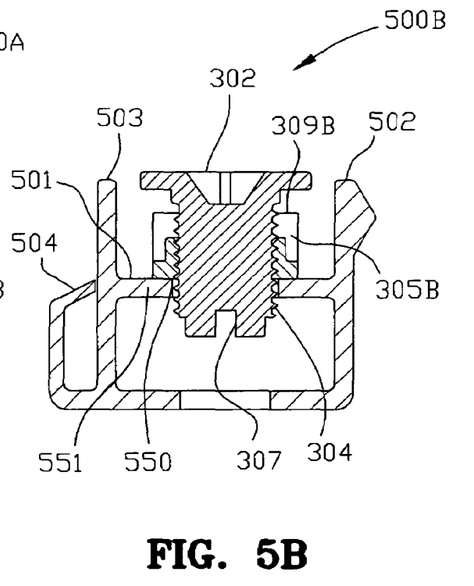
FIG. 5B is a cross-sectional view similar to FIG. 5A illustrating the adjustment of the threaded stud and its flat head enabling positioning of the threshold.

FIG. 5 is a bottom view of a threshold 500 with the fastener 300 of the instant invention press-fit therein. Walls 501, 502 and 503 form a channel in which fastener 300 partially resides. Walls 502 and 503 prevent excessive rotation of the rectangular nut 321. Reference numeral 570 indicates rotation of the nut as the receptacle is rotated in a counterclockwise direction as viewed in FIG. 5. FIG. 5A is a cross-sectional view 500A taken along the lines 5A-5A of FIG. 5 illustrating the press-fit attachment of the fastener 300 of the instant invention in a threshold. When the threaded stud 320 is press fit into the threshold the threads 304 of the stud grip the wall 501 of the threshold. The threads 304 are rotated thereafter as necessary to install and plumb the threshold and surface 302 of the stud is extracted from the threshold. This extraction causes the formation of a helical pattern as represented by reference numeral 550 to be formed in the wall 501 which has a thickness as represented by reference numeral 551. When threaded stud 320 is rotated, surface 308B of nut 321 remains in contact with wall 501 of the threshold. Nut 321 provides support to the threshold when the threaded stud is extended out of the nut as illustrated in FIG. 5B. FIG. 5B is a cross-sectional view 500B similar to FIG. 5A illustrating the adjustment of the threaded stud 320 and its flat head 302 enabling positioning of the threshold relative to a reference surface (not shown).

Those skilled in the art will readily recognize that the invention as set forth herein has been set forth by way of example only and that changes may be made to the invention without departing from the spirit and scope of the claims set forth below.

I claim:

1. A curvilinear delivery track in combination with a plurality of threshold adjustment devices, comprising:

said threshold adjustment devices residing adjacently to each other in and engaging said curvilinear delivery track;

said curvilinear delivery track includes: a generally vertically oriented slot therethrough; said first generally vertically oriented slot having a first width; a first generally horizontal slot therethrough and a second generally horizontal slot therethrough; said first generally horizontal slot traverses said generally vertically oriented slot forming a nut guide having a nut guide height; said second generally horizontally oriented slot traverses said generally vertically oriented slot forming a head guide having a head guide height; said nut guide height of said first generally horizontally oriented slot being greater than said head guide height of said second generally horizontally oriented slot; said first generally vertically oriented slot terminating in a rimmed edge portion;

each of said threshold adjustment devices includes: a threaded stud; said threaded stud includes a support head and a shoulder; said head of said threaded stud includes a lower surface and an upper surface; said head of said threaded stud being cylindrically shaped having a second width; a U-shaped in cross-section nut having a central portion, a first end and a second end; said first end of said nut includes a rectangularly shaped forward flange extending therefrom having a first height; said forward flange includes a first top portion; said second end of said nut includes a rectangularly shaped rearward flange extending therefrom having a second height; said rearward flange includes a second top portion; said first and second heights of said forward and rearward flanges being equal; said forward and rearward flanges each having a third width; said forward and rearward flanges include side end portions; said central portion of said U-shaped in cross-section nut includes a raised crown; said shoulder of said threaded stud is engageable with said raised crown of said U-shaped in cross-section nut; said central portion and said raised crown of said nut includes interior threads thereon; said U-shaped in cross-section nut includes a first upper surface and a second lower surface; said threaded stud interengaging interior threads of said U-shaped in cross-section nut and said raised crown of said nut; said forward and rearward flanges extend upwardly partially enveloping said threaded stud; said threaded stud includes first and second adjustment receptacles;

a portion of said lower surface of said U-shaped in cross-section nut slidingly interengaging said nut guide of said curvilinear delivery track in normal operation; said lower surface of said head of said threaded stud slidingly interengaging said head guide of said curvilinear delivery track in normal operation; said forward flange and said rearward flange extend upwardly beyond said nut guide and into said second generally horizontal slot forming said head guide in normal operation; said side end portions of said forward and rearward flanges slidingly interengage said nut guide prohibiting rotation of said U-shaped in cross-section nut;

said second width of said head of said threaded stud and said third width of said forward and rearward flanges each being larger than said first width of said vertically oriented slot of said delivery track preventing escape of said threshold adjustment devices from said curvilinear delivery track;

said forward flanges of said threshold adjustment devices engaging said rearward flanges of respective adjacent threshold adjustment devices; threshold adjustment devices being vertically movable with respect to said adjacent threshold devices; said forward and rearward flanges of adjacent threshold adjustment devices being vertically movable with respect to each other; said vertical movement of said forward and rearward flanges limited by said first top portion of said forward flange and/or said second top portion of said rearward flange interengaging said rimmed edge portion of said first vertical slot and said head guide; said heights of said forward and said rearward flanges of adjacent threshold adjustment devices, when combined, form a combined height of said flanges; said nut guide height and said head guide height, when combined, form a combined height of said guides; and said combined height of said forward and rearward flanges exceeds said combined heights of said guides which prohibits shingling and/or jamming of said adjacent threshold devices residing in said curvilinear delivery track;

and, said vertical movement of said adjustment devices being limited by interengagement of said upper surface of said head of said threaded stud with said rimmed edge portion of said slot and said head guide which prohibits shingling and/or jamming of said adjacent threshold devices residing in said curvilinear delivery track.

2. A threshold adjustment device in combination with a threshold, comprising:

said threshold adjustment device includes: a threaded stud; said threaded stud includes a support head and a shoulder; said head of said threaded stud includes a lower surface and an upper surface; said head of said threaded stud being cylindrically shaped; a U-shaped in cross-section nut having a central portion, a first end and a second end; said first end of said nut includes a rectangularly shaped forward flange extending therefrom having a first height; said forward flange includes a first top portion; said second end of said nut includes a rectangularly shaped rearward flange extending therefrom having a second height; said rearward flange includes a second top portion; said first and second heights of said forward and rearward flanges being equal; said forward and rearward flanges include side end portions; said central portion of said U-shaped in cross-section nut includes a raised crown; said shoulder of said threaded stud is engageable with said raised crown of said U-shaped in cross-section nut; said central portion and said raised crown of said nut includes interior threads thereon; said U-shaped in cross-section nut includes a first upper surface and a second lower surface; said threaded stud interengaging interior threads of said U-shaped in cross-section nut and said raised crown of said nut; said forward and rearward flanges extend upwardly partially enveloping said threaded stud; said threaded stud includes first and second adjustment receptacles;

said threshold includes a channel; said channel includes a first vertically oriented support wall, a second vertically oriented support wall, and an intermediate horizontally extending wall; said intermediate horizontally extending wall includes a floor-side surface and a threshold-side surface; said threshold further includes a horizontally extending threshold surface and a mating wall; said horizontally extending threshold surface further includes an aperture therein enabling access to said second adjustment receptacle of said threaded stud;

said intermediate horizontally extending wall of said channel includes a bore therein; said threaded stud being press-fit in said bore of intermediate horizontally extending wall of said channel, and said U-shaped in cross-section nut being press-fitted to said floor-side surface of said intermediate horizontally extending wall;

said forward and rearward flanges of said U-shaped in cross-section nut residing within said channel and in proximity to said first and second vertically oriented support walls; said side portions of said forward and rearward flanges engaging one of said first or second vertically oriented support walls of said channel depending on the direction of rotation of said threaded stud; said U-shaped in cross-section nut is constrained against rotation by said channel; and, said upper surface of said threaded stud is adjustable in a plurality of positions adjusting the height above ground of said horizontally extending threshold surface.

* * * * *

UNITED STATES PATENT AND TRADEMARK OFFICE
CERTIFICATE OF CORRECTION

| | |
|---|---|
| PATENT NO. | : 7,540,699 B2 |
| APPLICATION NO. | : 10/824915 |
| DATED | : June 2, 2009 |
| INVENTOR(S) | : Stephen Selle |

Page 1 of 1

It is certified that error appears in the above-identified patent and that said Letters Patent is hereby corrected as shown below:

Col. 4, line 4, after "and" delete "SB" and insert -- 5B --.

Col. 4, line 37, after second occurrence of "FIG." delete "SA" and insert -- 5A --.

Signed and Sealed this

Fourteenth Day of July, 2009

JOHN DOLL
*Acting Director of the United States Patent and Trademark Office*